United States Patent [19]

Schmidt

[11] 4,154,373
[45] May 15, 1979

[54] BUCKET WHEEL CHARGING VALVE

[75] Inventor: Horst Schmidt, Bergisch Gladbach, Fed. Rep. of Germany

[73] Assignee: Klöckner-Humboldt-Deutz AG, Fed. Rep. of Germany

[21] Appl. No.: 865,623

[22] Filed: Dec. 29, 1977

[30] Foreign Application Priority Data

Dec. 30, 1976 [DE] Fed. Rep. of Germany ....... 2659450

[51] Int. Cl.² .......................................... G01F 11/00
[52] U.S. Cl. .................................. 222/272; 222/278; 222/281; 222/342; 222/360
[58] Field of Search ............... 222/272, 278, 281, 342, 222/360

[56] References Cited

U.S. PATENT DOCUMENTS

| 1,032,132 | 7/1912 | Gormley | 222/281 |
| 2,508,195 | 5/1950 | Seaman et al. | 222/272 |
| 3,118,574 | 1/1964 | Comte | 222/272 X |

FOREIGN PATENT DOCUMENTS 227973  3/1910 Fed. Rep. of Germany ........... 222/272

Primary Examiner—Allen N. Knowles
Attorney, Agent, or Firm—Hill, Gross, Simpson, Van Santen, Steadman, Chiara & Simpson

[57] ABSTRACT

A bucket wheel charging valve having an outer enclosing housing with first and second counter-rotatable wheels on parallel axes therein with each wheel having cells along the periphery with the cell walls swung on an axis coincident with the opposite wheel and the tip end of the spokes between the cells sweeping the cells of the opposite wheel as each wheel is incrementally advanced while the other cell is stationary.

10 Claims, 4 Drawing Figures

BUCKET WHEEL CHARGING VALVE

BACKGROUND OF THE INVENTION

The invention relates to improvements in charging valves which pass a controlled predetermined amount of material from a supply to a working machine requiring the amount of material. More particularly, the invention relates to a bucket wheel charging valve having parallel alternately rotatable wheels each with cells or pockets on the periphery thereof.

Passing a valved charge to a work machine such as a comminution machine having a flow through of hot gasses with the materials is accomplished with the use of a bucket wheel or a double oscillating charging valve. Double oscillating valves are very disadvantageous because of the necessity of discontinuous operation, but also because of the necessity of low supply speed as the materials passing through the charging valve require a long release and dropping time. By comparison, bucket wheel charging valves which have heretofore been used make it possible to have a continuous operation, but difficulties are encountered with the adhesion of material onto the walls of the bucket which is particularly true when charging moist materials. Material depositing and adhering to the walls of the charging valves lead to a substantial decrease or to an undesirable alteration of the output quantity passed by the valve. Quantitatively controlled and uniform charging of a work machine with materials, particularly with moist or adherent materials has not been possible with valves heretofore used with the types of aggregates and material referred to.

It is accordingly an object of the present invention to provide an improved bucket wheel charging valve which makes possible the uniform charging of a work machine with materials, and particular moisture adhesive materials.

In accordance with a feature of the invention, the object is attained by providing a bucket wheel where the wheel has arcuate recesses in the periphery having the recesses or cells with their inner walls constructed on the arc of a circle. The bucket wheels are rotated alternately with each alternately driven at a prescribed angle of rotation which is equal to the width of the particular cell or recess of the other wheel. The bucket wheels are also arranged to be spaced from each other so that the outer rim end of the spoke between the recesses passes in close running or cleaning relationship to the wall of the recess of the opposite bucket wheel. The bucket wheel charging valve construction of the present invention includes an outer rim of spokes between each of the pockets so that the rim of the driven wheel slides along the inner wall of the arc shaped recess of the non-driven wheel and with the wheels driven alternately, there is a constant cleaning of each of the bucket walls. The buckets of the bucket wheels are maintained in operation and always kept free from adhering material. The bucket wheels are driven at a predetermined controlled arcuate rotation and at a controlled speed so that constant quantities of material are supplied to the work machine. The bucket wheel charging valve construction of the invention makes possible a constant uniform charging of the treatment or processing machine with materials, and particularly with moisture adhesive materials, and therefore, optimum control of the amount of material passed is attained over a long period of time which is not altered by the build-up of material to foul the valve and change its rate of delivery.

A further feature of the invention is that there is provided a drive for the bucket wheel charging valve including a crank with a connecting rod which connects to lever arms that are connected to a rotary drive on the axis of each of the bucket wheels and the crank drive continues in uniform rotation to drive the bucket wheels alternately in counter-rotation through a specific angle which includes the width of the cell formed on the periphery of the bucket wheel. The crank drive with its connecting rod connected to the lever arms are connected to a one-way rotary drive arranged on the axis of each of the bucket wheels so that they are alternately rotated through a specific angle of rotation.

A further feature of the invention is the provision of a rotary drive for each of the bucket wheels in the form of a free wheeling or a gripping clutch roller drive arrangement or a pawl drive ratchet arrangement.

Other advantages, objects and features, as well as equivalent structures which are intended to be covered herein, will become more apparent with the teaching of the principles of the invention in connection with the disclosure of the preferred embodiments in the specification, claims and drawings, in which:

DRAWINGS

DESCRIPTION

Figure 1:
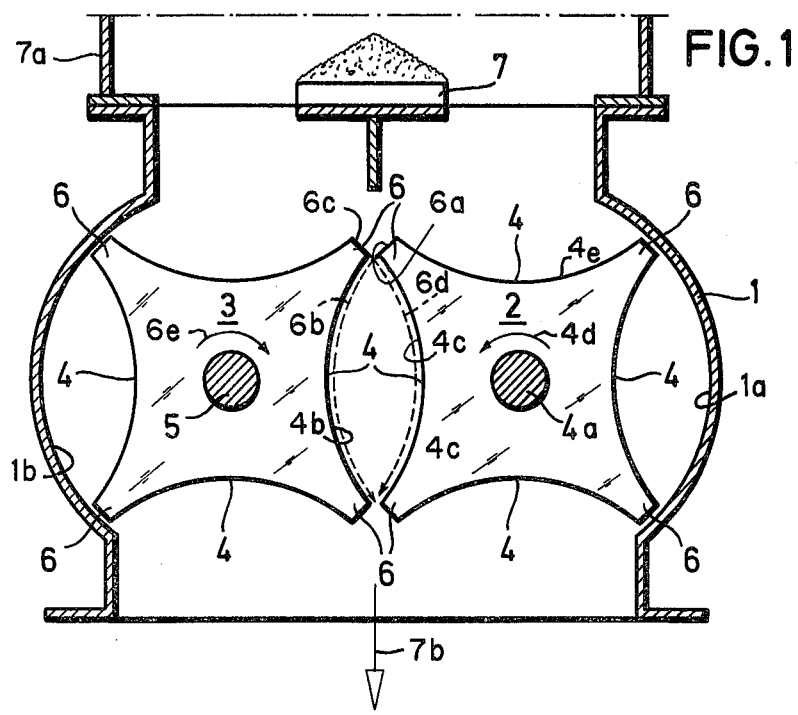
FIG. 1 is a vertical sectional view taken through the housing of a bucket wheel charging valve constructed and operating in accordance with the principles of the present invention.

FIG. 1 illustrates a housing 1 with counter-rotatable bucket wheels 2 and 3 supported on axles 4a and 5 within the housing.

Each of the bucket wheels has a series of cells or recesses or pockets 4 on its outer periphery with the inner walls of the recesses being constructed on the arc of a circle. The arc of the circle is such that the center of the arc is coincident with the shaft of the opposite wheel when the recess is facing said opposite wheel. For example, in FIG. 1, the wall 4b has its center at the axis of the shaft 4a of the opposite wheel. Similarly, the center of the arc of the wall 4c is coincident with the axis of the shaft 5 of the opposite wheel.

The distance or spacing between the shafts 4a and 5 of the bucket wheels 2 and 3 are such that the rim of the driven bucket wheel passes in close running relationship to the inner wall of the recess of the non-driven bucket wheel. Each of the recesses have spokes 6 therebetween with the outer tips 6a of the spoke being the rim of the wheel. Thus, the rim 6a of the spokes 6, shown in FIG. 1, will traverse the dotted line path 6b as the wheel 4 is advanced in the direction shown by the arrowed line 4d. The tip 6c or rim, will traverse the line 6d as the wheel 6 is advanced in the direction of the arrowed line 6e.

The bucket wheels 2 and 3 which are illustrated are each provided with four equally spaced recesses spaced at an angle of 90° with respect to each other. With this spacing, each bucket wheel is alternately advanced 90° when it is driven.

Means are provided for supplying a flow of material to the valve mechanism which will flow from a conduit 7a above the valve, and a plate shaped material distributing device 7 is shown in the center of the spacing above the bucket wheels to aid in the material flowing directly into the recesses.

After the material passes the valve, it flows downwardly in the direction of the arrowed line 7b to a work machine receiving the material.

Figure 2:
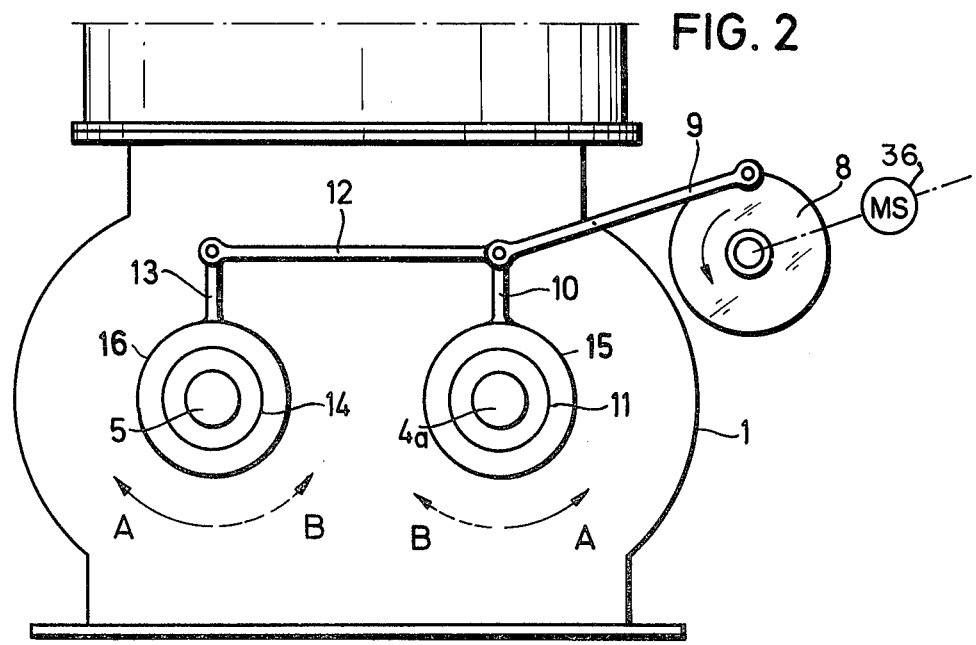
FIG. 2 is a somewhat schematic view of the exterior of the bucket wheel charging valve illustrating the external crank driving mechanism thereof.

As illustrated in FIG. 2, the drive mechanism for the bucket valve includes a crank 8 which is driven in rotation by a power means, not shown. Preferably, the crank can be driven at a constant speed rotation, and the mechanism provided will incrementally and alternately advance the bucket wheels. The crank has a connecting rod 9 which is connected to simultaneously pivot lever arms 10 and 13. An actuator rod or link 12 interconnects the free ends of each of the lever arms 10 and 13 so that they will simultaneously be driven in pivotal motion. The lower end of the lever arms 10 and 13 are connected to the bucket wheels through one-way free wheeling clutches as will be described in connection with FIG. 3 or in an alternate arrangement, in connection with FIG. 4.

Figure 3:
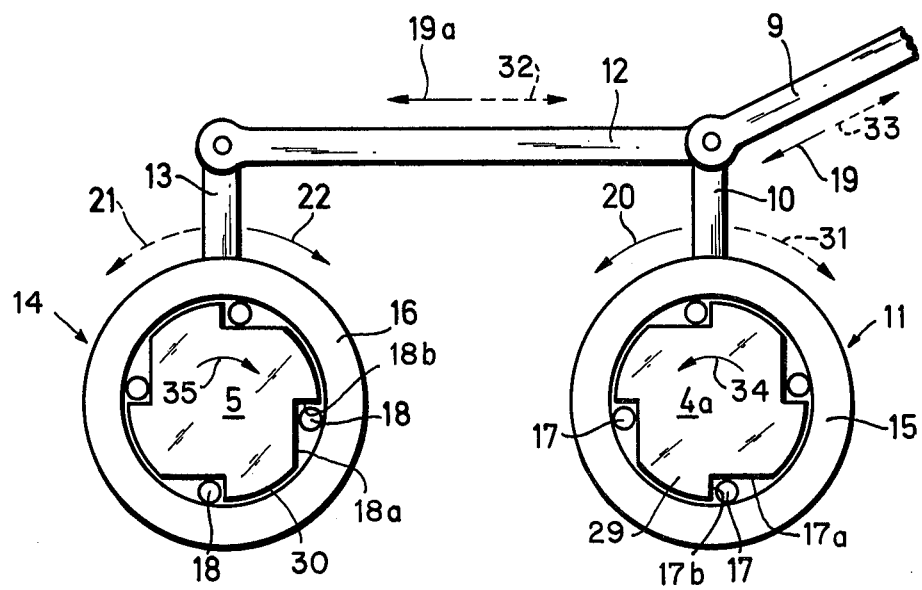
FIG. 3 is a detailed enlarged view, with parts omitted for clarity, of a free wheeling clutch drive for the valve.

The rotary drives are shown generally at 11 and 14 in FIGS. 2 and 3, and include an annular ring or raceway 15 or 16. The drive shafts 4a and 5 have hubs at their ends within the rings 15 and 16. Driving rollers 17 and 18 are positioned between the hubs and the inner surface of the rings. The hubs 29 and 30 have recesses around their periphery containing the rollers 17 and 18 respectively, and the recesses are so constructed so that when the drive mechanism moves to the left in FIG. 3, the shaft 4a will be driven forwardly, but the shaft 5 will remain stationary. When the drive mechanism moves to the right in FIG. 3, the shaft 5 will be driven forwardly while the shaft 4a will remain stationary.

These recesses are arranged so that the hub 29 has a portion 17a sloping toward the inner surface of the ring 15 so that the roller will drive the hub when the ring 15 moves in a counter-clockwise direction, but the roller will move back against a shoulder 17b when the ring 5 moves in a clockwise direction. Similarly, the hub 30 has a sloping portion 18a leading toward the inner surface of the ring 16 so that the hub 30 will be driven when the ring 16 moves in a clockwise direction, but the roller 18 will move back against a shoulder 18b so that the hub 30 is not driven when the ring 16 moves in a counter-clockwise direction.

With reference to the arrowed lines, when the crank arm 9 moves in the direction of the solid arrowed line 19, the link 12 moves in the direction of the solid arrowed line 19a, and each of the arms 10 and 13 will swing to the left. The ring 15 will move in the direction of the solid line arrow 20, and the shaft 4a will be driven in rotation in the direction of the arrowed line 34. Simultaneously, the ring 16 will move in the direction of the broken arrowed line 21, and the ring 16 will turn freely on the hub so that the shaft 5 will not be driven. When the crank 9 moves in the opposite direction, as indicated by the broken arrowed line 33, and the link 12 moves in the direction of the broken arrowed line 32, the crank arm 13 moves in the direction of the solid arrowed line 22 driving the ring 16 and driving the shaft 5 in the direction of the arrowed line 35. The ring 11 will move in the direction of the broken arrowed line 31, and the shaft 4a will not be driven. Thus, with the back and forward movement of the crank arm 9, the shafts and their supported bucket wheels alternately rotate toward each other in the direction of the arrowed lines 4d and 6e of FIG. 1.

The size of the crank 8 is chosen relative to the length of the lever arms 10 and 13 so that they will swing through an arc of 90° with each rotation of the crank. When bucket wheels are used with recesses that are spaced apart more or less than 90°, corresponding change in the size of the crank arm 8 and lever arms 10 and 13 are chosen. A variable speed control may be provided for the crank arm 8 as indicated at 36 so that the quantity of material passed will be a function of the speed of operation of the crank 8 as determined by the control 36.

Figure 4:
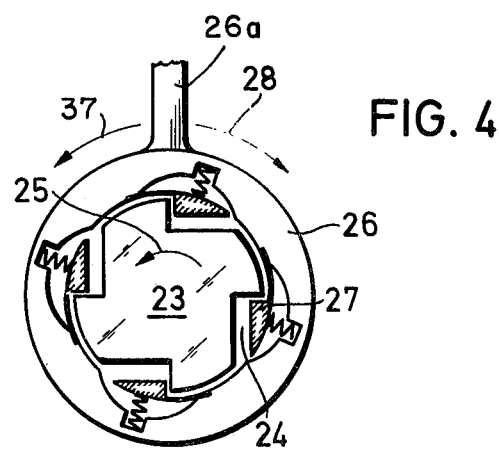
FIG. 4 is an enlarged detailed view of a pawl drive for the valve, illustrating a drive for only one of the wheels.

FIG. 4 illustrates an alternate type of drive with a ring 26 operated by a lever arm 26a driven by a crank mechanism similar to that shown in FIG. 3. A hub 23 is connected to the shaft of the bucket wheel and is provided with pockets 24 on its outer periphery with pawls 27 therein. The pawls are arranged so that as the ring 26 is driven in the direction of the solid arrowed line 37, the pawls will effect a driving engagement between the ring 26 and the hub 23 to drive the bucket wheel. When the ring 26 moves to the right, in the direction of the broken arrowed line 28, the pawls 27 will release so that the hub 23 is not driven. The hub is shown driven to the left in the direction of the arrowed line 25 so that as illustrated, the mechanism will be connected to the shaft 4a for the right bucket wheel. A corresponding pawl or ratchet drive, such as shown in FIG. 4, will be provided for the shaft 5 of the left bucket wheel.

Instead of bucket wheels with four buckets as shown in the drawing of FIG. 1, bucket wheels may be installed which have three, six or other numbers of buckets. Each recess, of course, will be constructed with its wall in the shape of the arc of a circle so that the tooth of the other bucket will sweep the arc and perform an automatic cleaning operation as it discharges the recess. When wheels are employed with numbers of recesses other than those illustrated in the drawing, the crank and rotary drive are adjusted so that the wheels in each case are rotated at an angle equal to the spacing between buckets. The recesses are uniformly spaced on the wheel with the spokes uniformly spaced between the recesses. With X equalling the number of recesses employed, the arc of rotation of each wheel for each advance is X/360 degrees. Thus, with a wheel having three buckets, each wheel must be rotated for each time it is drived through an angle of 120°. Similarly, a wheel with six buckets is advanced 60° with each forward rotational drive. Other drive mechanisms may be employed such as employing crank guide drives or oscillating hydraulic cylinders.

In operation, as shown in FIG. 1, material drops downwardly through the conduit 7a onto the bucket wheels, and the bucket wheel 4 is rotated to the left in the direction of the arrowed line 4d through 90° so that the rim or end 6a of the tooth sweeps the pocket 4b and drops the contents of the pocket downwardly in the direction of the arrow 7b. The other bucket wheel 6 is then driven to the right in the direction of the arrowed line 6e so that its tooth end 6c sweeps the pocket 4c (of course, since the wheel 4a is advanced, the pocket 4e will be in position to be swept by the tooth 6c). The contents of the pocket 4e then drops downwardly, and the pocket is simultaneously cleaned.

The inner arcuate walls 1a and 1b of the housing are arranged so that the ends of the teeth will be in close running relation thereto to form a gas-tight closure, and the pockets of material themselves will form a closure between the two bucket valves. The charging will remain uniform and as a direct function of the speed of operation. Also, it will be seen that the bucket wheels may be readily changed with more or less pockets, and the size of the pocket correspondingly changed as may be dictated by the necessities in physical properties of different materials.

The bucket valve remains constantly cleaned throughout continued operation insuring accuracy and reliability and eliminating the need for cleaning and servicing.

I claim as my invention:

1. A bucket wheel charging valve comprising in combination:

two bucket wheels drivable counter-rotational to one another in the direction of movement of a stream of material;

means defining recesses on the periphery of the bucket wheels with outer rim portions between the recesses with the recesses lying on the arc of a circle for each wheel;

driving means for alternately rotating each of said wheels at an angle to one another, said angle being the width of the particular recess of the alternate non-driven bucket;

and the bucket wheels being spaced from each other so that the outer rim of the bucket being driven slides along the wall of the recess of the non-driven wheel.

2. A bucket wheel charging valve constructed in accordance with claim 1 and characterized by:

a crank drive;
a connecting rod connected to the crank drive;
lever arms connected to said rod;
a rotary drive for each of the connecting rods arranged on an axis of each of the bucket wheels, said rotary drives rotatably alternately advancing each of the wheels with each revolution of the crank drive at the angle which includes the width of the bucket recess transversed by the rim of the movable wheel.

3. A bucket wheel charging valve constructed in accordance with claim 2 and characterized by:

the rotary drive of each bucket wheel is constructed as a free wheeling clutch to drive the wheel with movement of the lever arm in one direction and permit the wheel to remain stationary with movement of the lever arm in the other direction.

4. A bucket wheel charging valve constructed in accordance with claim 2 and characterized by:

the rotary drive is in the form of a single direction ratchet with the bucket wheel being advanced with movement of a lever arm in one direction and remaining stationary with movement with the lever arm in the opposite direction.

5. A bucket wheel charging valve constructed in accordance with claim 1 and characterized by:

each bucket is provided with four recesses with outer rim portions between each of the recesses and the recesses uniformly spaced from each other at an angle of 90°.

6. A bucket wheel charging valve comprising in combination:

first and second bucket wheels counter-rotatable on parallel axes each having spokes with outer rim portions and the spokes defining material receiving cells therebetween with the cells having arcuate walls with their radial centers being coincident with the axis of the other bucket wheel, said spokes of each wheel being of a length so that the rim tip sweeps the wall of the cell of the other wheel as each wheel is incrementally rotated to pass the contents of the cell, each of said wheels having X number of cells and spokes;

and an incremental drive for alternately driving each of the wheels through an arc of X/360 degrees, so that the cells receive the material at one side of the wheels and the material is discharged as a function of pocket size and wheel rotational speed at the other side of said wheels.

7. A bucket wheel charging valve constructed in accordance with claim 6:

and including a one-way clutch drive for each of the wheels with a common drive mechanism alternately driving the one-way clutches through an arc of X/360 degrees.

8. A bucket wheel charging valve constructed in accordance with claim 6:

including a housing surrounding said bucket wheels with arcuate walls outwardly from said wheels positioned in close proximity to the rim tips of the spokes.

9. A bucket wheel charging valve constructed in accordance with claim 8:

including means for delivering material to one side of the wheels in said housing;
and means for receiving the material at the other side of the wheels from said housing.

10. A bucket wheel charging valve constructed in accordance with claim 6:

including first and second shaft means respectively for said first and second wheels;
one-way clutches with the driven side of the clutches connected to each of said shaft means;
first and second parallel lever arms connected to the driving side of each of said one-way clutches;
a lever interconnecting the free ends of said lever arms;
a connecting rod connected to said link;
and a drive crank connected to said connecting rod whereby for each rotation of the crank the lever arms are swung through an arc equal to X/360 degrees.

* * * * *